US012774191B2

(12) United States Patent
Marshall

(10) Patent No.: US 12,774,191 B2
(45) Date of Patent: Oct. 27, 2026

(54) MODULAR SPREAD BAR DEVICE WITH STIFFENING TRUSS

(71) Applicant: Joseph T. Marshall, Rathwell (CA)

(72) Inventor: Joseph T. Marshall, Rathwell (CA)

( * ) Notice: Subject to any disclaimer, the term of this patent is extended or adjusted under 35 U.S.C. 154(b) by 1015 days.

(21) Appl. No.: 17/989,092

(22) Filed: Nov. 17, 2022

(65) Prior Publication Data

US 2023/0150798 A1 May 18, 2023

(30) Foreign Application Priority Data

Nov. 18, 2021 (CA) ..................................... 3139396

(51) Int. Cl.
*B66C 1/16* (2006.01)

(52) U.S. Cl.
CPC ..................................... *B66C 1/16* (2013.01)

(58) Field of Classification Search
CPC .................................... B66C 1/16; B66C 1/10
See application file for complete search history.

(56) References Cited

U.S. PATENT DOCUMENTS 1,846,038 A * 2/1932 Owens .................... B66C 1/663 294/81.5
1,970,617 A * 8/1934 Morgan .................. B66C 1/663 294/81.56
2,987,340 A * 6/1961 Mattera ..................... B66C 1/20 294/81.2
3,502,364 A * 3/1970 Moore ...................... B66C 1/16 294/81.1
7,066,343 B1 * 6/2006 Khachaturian ......... B66C 19/02 212/270
2013/0020818 A1 * 1/2013 Parker ....................... B66C 1/10 294/81.5

FOREIGN PATENT DOCUMENTS

FR 3109935 A1 * 11/2021 ............... B66C 1/16

OTHER PUBLICATIONS

FR 3109935 A1—English Translation, 2021.*

* cited by examiner

*Primary Examiner* — Stephen A Vu
(74) *Attorney, Agent, or Firm* — Ryan W. Dupuis; Kyle R. Satterthwaite; Ade & Company Inc.

(57) ABSTRACT

A spread bar device is used to suspend a load from a crane using a lifting harness having a plurality of attachment cables. The spread bar device includes a modular central beam structure assembled from a main beam section and interchangeable end beam sections that are releasably coupled at opposing ends of the main beam section to vary the length of the spread bar device according to the load. One or more truss frames protrude laterally outward from the central beam structure to provide lateral stiffening to ensure sufficient strength while minimizing weight of the spread bar, despite the modular construction of the central beam assembly.

19 Claims, 11 Drawing Sheets

MODULAR SPREAD BAR DEVICE WITH STIFFENING TRUSS

This application claims foreign priority benefits from Canadian Patent Application 3,139,396, filed Nov. 18, 2021.

FIELD OF THE INVENTION

The present invention relates a spread bar device to assist in evenly distributing a load across a set of attachment cables of a lifting harness suspended from a crane, and more particularly the present invention relates to a modular spread bar device which can be reconfigured in length and which makes use of trusses to provide stiffening to a central beam assembly of the spread bar device.

BACKGROUND

When lifting elongated cargo items with a crane, it is common to use a lifting harness comprised of multiple attachment cables that are joined to a common lifting cable of the crane to form a lifting harness. A rigid beam known as a spread bar can be used to maintain separation of the multiple attachment cables and defining a plurality of spread apart lifting points from which the elongated cargo item can be suspended. Spread bars are typically required to be reasonably massive in construction to sufficiently resist any lateral bending when loaded, but the increased mass required for stiffness limits the amount of cargo that can be carried by the crane and/or the lateral distance that the crane can reach to remain within lifting limits of the crane. Furthermore, typical spread bars do no readily accommodate different lengths of cargo items unless using a complex lifting frame in place of the spread bar, but such lifting frames require assembly of many components.

SUMMARY OF THE INVENTION

According to one aspect of the invention there is provided a spread bar device for suspending a load from a crane using a lifting harness having a plurality of attachment cables, the device comprising:

a main beam section which extends in a longitudinal direction of the main beam section;

at least one secondary beam section which extends in a respective longitudinal direction of the secondary beam section;

a beam coupling arrangement associated with said at least one secondary beam section so as to be arranged to releasably couple the secondary beam section to one end of the main beam section such that the longitudinal direction of the secondary beam section is aligned with the longitudinal direction of the main beam section; and a plurality of cable anchors supported on the main beam section and said at least one secondary beam section so as to be arranged for connection to the attachment cables of the lifting harness respectively;

the cable anchors being positioned on the beam sections so as to be arranged to both (i) suspend the main beam section from the lifting harness when the main beam section is separated from said at least one secondary beam section and (ii) suspend the main beam section and said at least one secondary beam section from the lifting harness when the main beam section is coupled to said at least one secondary beam section.

The modular construction of the spread bar device comprised of multiple beam sections that can be used individually or connected end to end to form a longer beam assembly allows the spread bar device to accommodate a larger variety of loads.

Preferably said at least one secondary beam section comprises two secondary beam sections each having a respective beam coupling arrangement associated therewith, in which the beam coupling arrangements are arranged to releasably couple the secondary beam sections to opposing ends of the main beam section.

The cable anchors may include two cable anchors at spaced apart positions along the main beam section and one cable anchor on each secondary beam section.

The device may be a kit that further includes at least one third beam section which extends in a respective longitudinal direction of the third beam section, the third beam section having a beam coupling arrangement associated therewith such that the third beam section is arranged to be selectively mounted on one end of the main beam section interchangeably with said at least one secondary beam section, in which each third beam section is different in length than the secondary beam sections.

In this instance there may be two secondary beam sections which are identical in length and which have respective beam coupling arrangements associated therewith, and two third beam sections which are identical to one another in length but different from the secondary beam sections and which have respective beam coupling arrangements associated therewith.

Each beam coupling arrangement may include a pair of guide flanges protruding beyond an end of one of the beam sections in diverging relation to one another for guiding alignment of the beam section with an adjacent beam section to be coupled thereto.

Each beam coupling arrangement may include a primary pin coupling the beam sections in end to end abutment with one another. The primary pin of each beam coupling arrangement is preferably located spaced above the beam sections.

Each beam coupling arrangement may further include a secondary pin coupling the beam sections in end to end abutment with one at a location spaced below the primary pin.

The device may further include at least one truss frame extending laterally outwardly from the beam sections so as to provide resistance to lateral bending of the beam sections. In the illustrated embodiment, two truss frames extend laterally outwardly from opposing sides of the beam sections.

The at least one truss frame may include a main truss frame having a web member extending laterally outwardly from the main beam section and two chords extending in opposing directions from the web member in connection between the web member and the main beam section.

The at least one truss frame may further include a modular truss frame associated with said at least one secondary beam section, in which the modular truss frame has a web member extending laterally outwardly from the main beam section and a chord in connection between the web member and the secondary beam section.

The at least one truss frame includes two modular truss frames associated with said at least one secondary beam section, in which the two modular truss frames include respective web members extending laterally outwardly from opposing sides of the main beam section and respective chord members in connection between the respective web members and the secondary beam section.

Each beam section preferably includes two feet spaced laterally outwardly from each side of the main beam section at longitudinally spaced positions so as to be arranged to support the beam section spaced above a supporting surface upon which the feet are engaged.

The device preferably further includes a plurality of strap mounts supported at spaced apart positions along a bottom of the beam sections, each strap mount being arranged to receive a load strap secured thereon for suspending a load from the strap mount.

According to a second aspect of the present invention there is provided a spread bar device for suspending a load from a crane using a lifting harness having a plurality of attachment cables, the device comprising:

a central beam assembly defining a singular beam extending in a longitudinal direction of the central beam assembly;

a plurality of cable anchors supported on the central beam assembly so as to be arranged for connection to the attachment cables of the lifting harness respectively; and at least one truss frame extending laterally outwardly from the central beam assembly so as to provide resistance to lateral bending of the central beam assembly.

The truss frame enables a lighter gauge of material to be used to form the central beam assembly of the spread bar while still providing sufficient strength to resist lateral bending of the beam assembly when loaded. By reducing the mass of the spread bar, the same load carried on the spread bar can be displaced a further lateral distance from the crane, or a larger load can be carried by the spread bar, while still remaining within lifting limits of the crane.

Thed at least one truss frame preferably comprises two truss frames extending laterally outwardly from opposing sides of the central beam assembly.

The at least one truss frame may include a main truss frame having a web member extending laterally outwardly from the central beam assembly and two chords extending in opposing directions from the web member in connection between the web member and the central beam assembly.

When the central beam assembly comprises (i) a main beam section which extends in a longitudinal direction of the main beam section, (ii) at least one secondary beam section which extends in a respective longitudinal direction of the secondary beam section, and (iii) a beam coupling arrangement associated with said at least one secondary beam section so as to be arranged to releasably couple the secondary beam section to one end of the main beam section such that the longitudinal direction of the secondary beam section is aligned with the longitudinal direction of the main beam section, the at least one truss frame preferably includes a modular truss frame associated with said at least one secondary beam section in which the modular truss frame has a web member extending laterally outwardly from the main beam section and a chord in connection between the web member and the secondary beam section.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
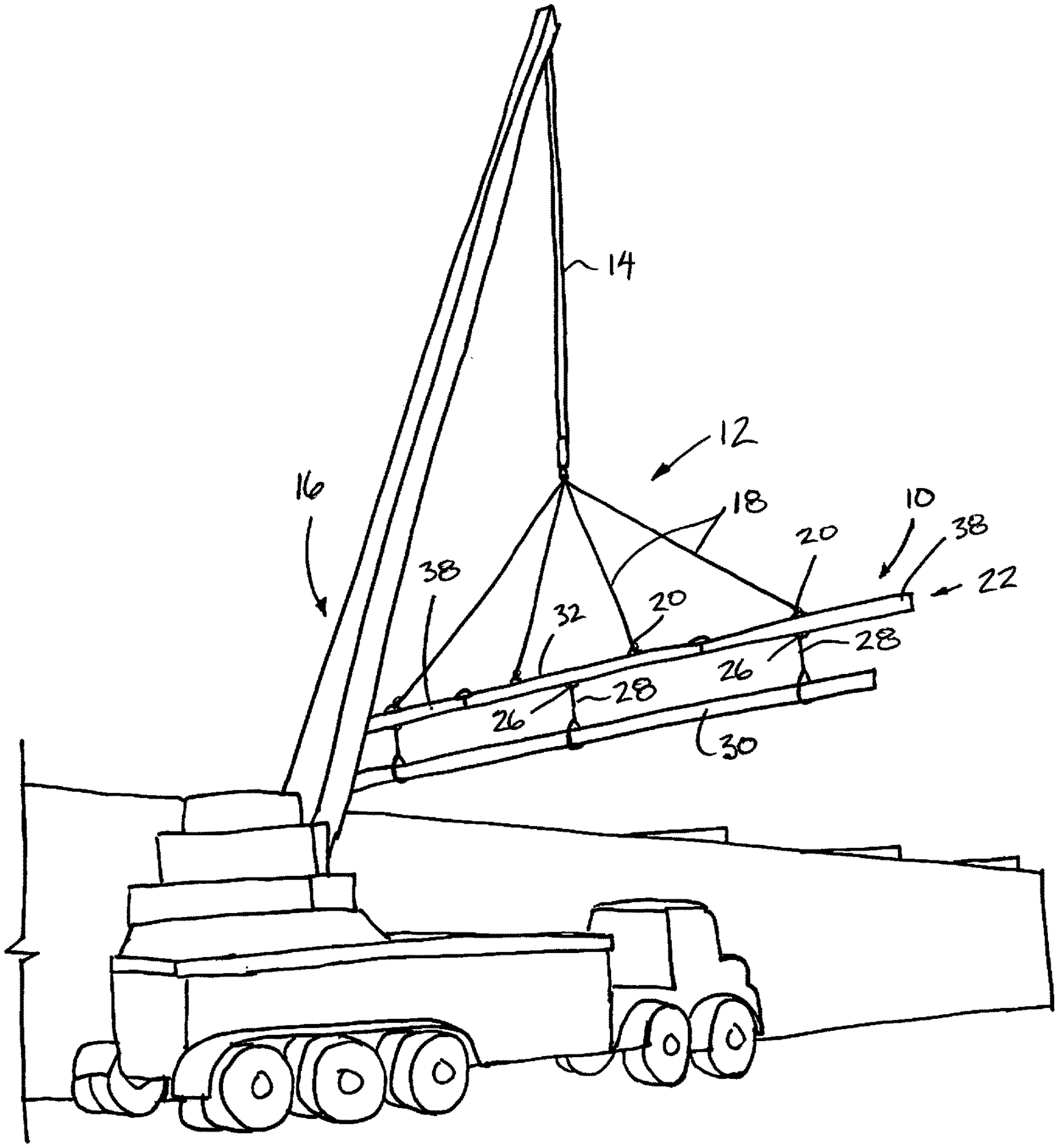
FIG. 1 is a perspective view of the spread bar device used in suspending a load from the lift harness of a crane.

Referring to the accompanying figures, there is illustrated a spread bar device generally indicated by reference numeral 10. The spread bar device 10 is particularly suited for use with a lifting harness 12 suspended from the lifting cable 14 of a crane 16. The lifting harness 12 typically comprises a plurality of attachment cables 18 having respective lift hooks 20 supported thereon for connection to the spread bar device 10 so that a load suspended from the spread bar device can be evenly distributed onto the various attachment cables 18 of the lifting harness.

The spread bar device 10 generally comprises an elongate central beam assembly 22 supporting a row of cable anchors 24 along the top of the assembly at spaced apart positions in a longitudinal direction of the central beam assembly within a single row for receiving the lift hooks 20 connected thereto respectively, and a row of strap mounts 26 longitudinally spaced along the bottom of the central beam assembly 22 from which load straps 28 can be coupled and suspended for attachment to a load 30 to suspend the load from the crane. The spread bar device is particularly suited for supporting a load in the form of an elongated item such as a stack of elongated building material members for example. In one example, a stack of standing seam roof panels, or other elongate structural members for a roof of a building can be secured by a plurality of load straps extending about the cargo item for suspension from respective strap mounts 26 of the device 10 to lift the load 30 onto the roof of the building using a crane as shown in FIG. 1.

Figure 2:
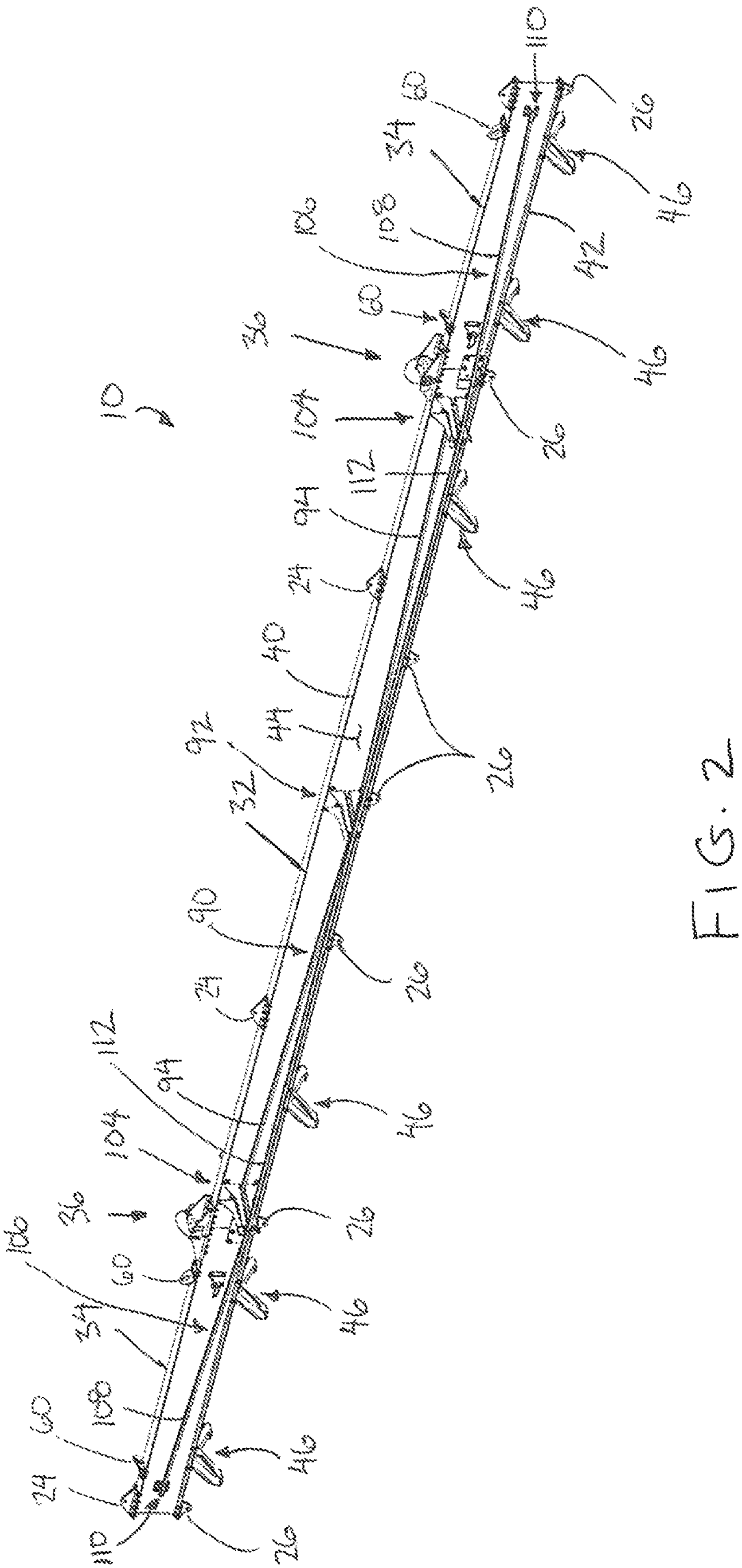
FIG. 2 is a perspective view of the spread bar device in a first configuration of the central beam assembly in which to secondary beam sections are supported at opposing ends of a main beam section.
Figure 3:
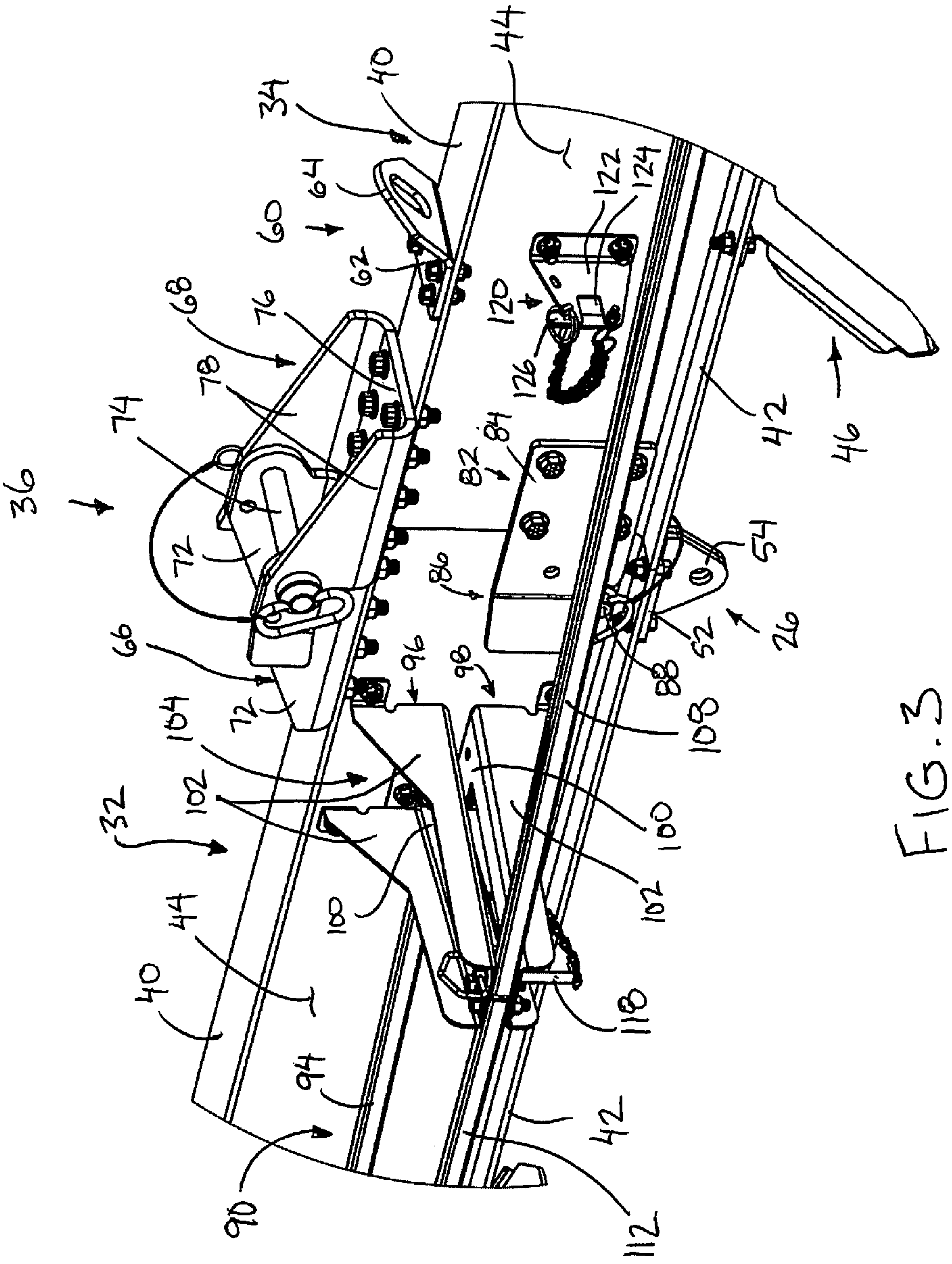
FIG. 3 is a perspective view of the junction between the main beam section and one of the secondary beam sections according to FIG. 2.
Figure 4:
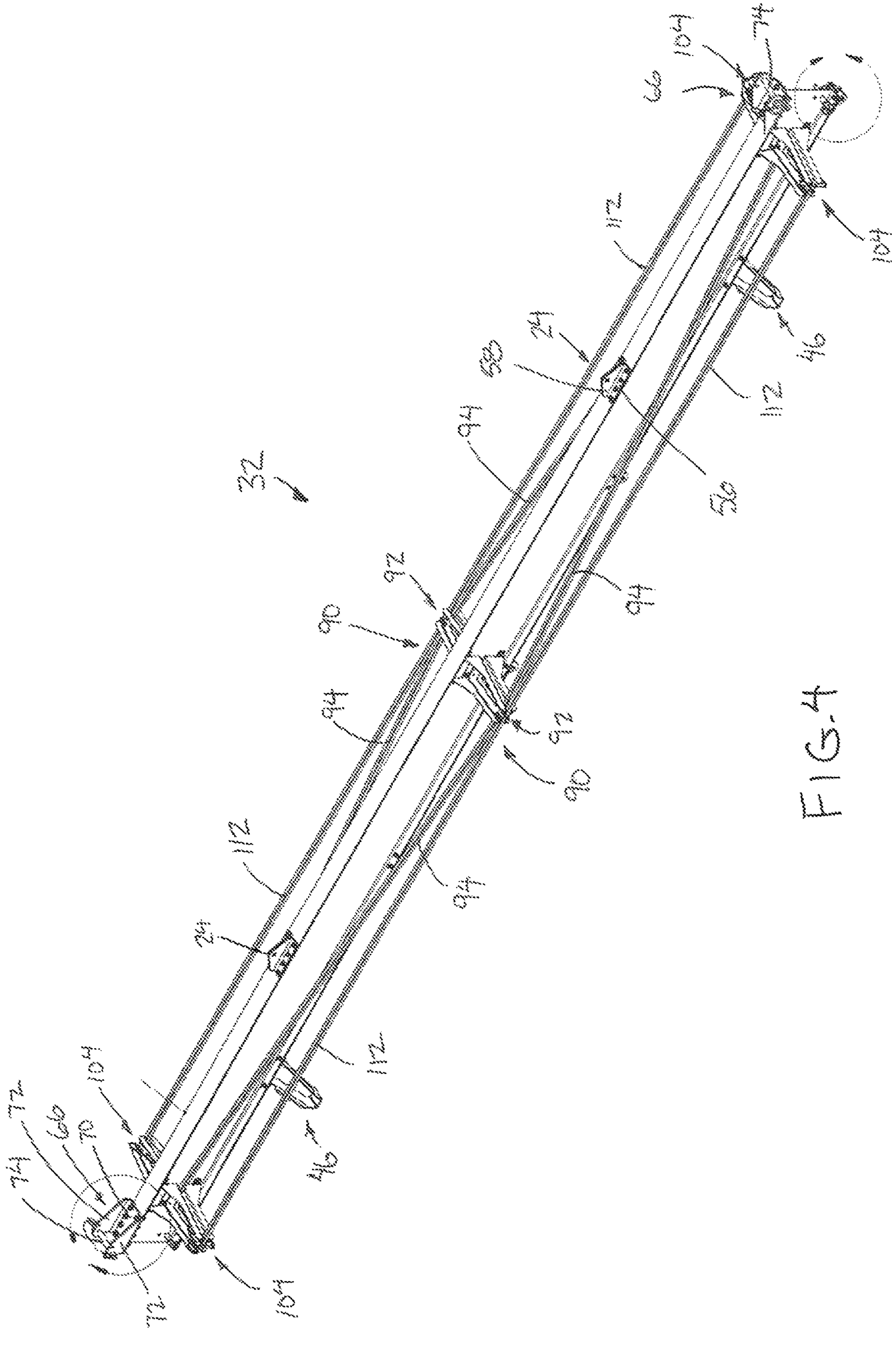
FIG. 4 is a perspective view of the spread bar device in a second configuration in which the main beam section is used alone.
Figure 5:
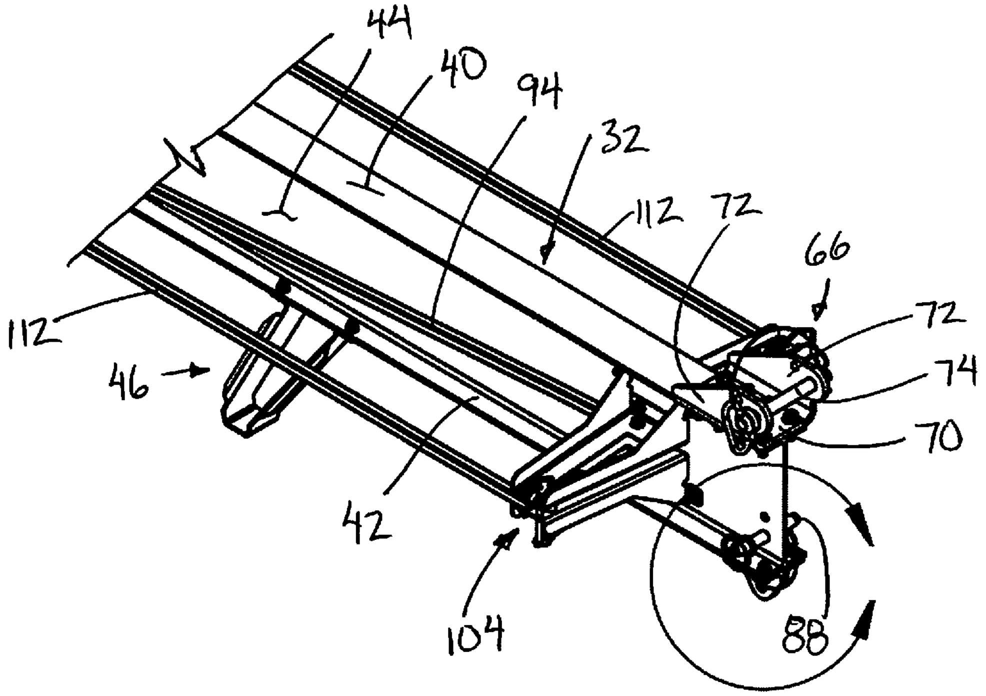
FIGS. 5 and 6 are enlarged views of respective opposing ends of the main beam section according to FIG. 4.
Figure 6:
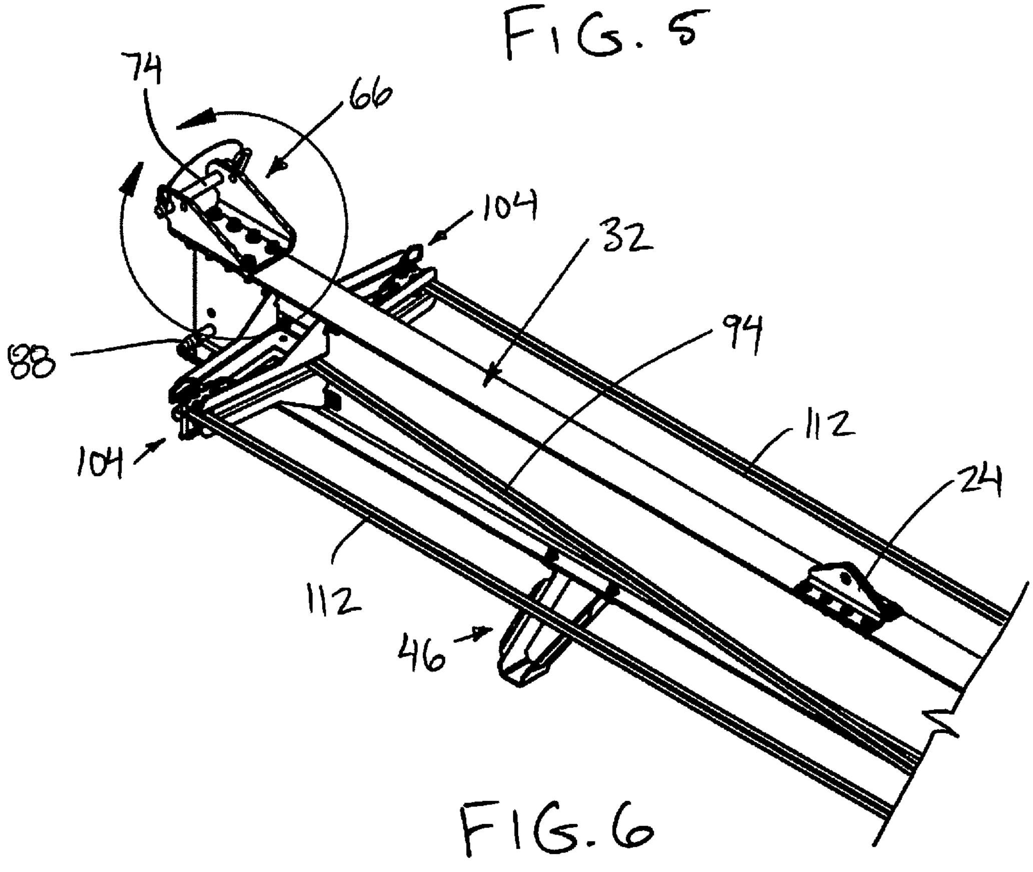

The central beam assembly 22 defines a singular elongate beam extending in a longitudinal direction between opposing ends of the device 10. As shown in FIG. 2, the central beam assembly can be assembled from a main beam section 32 centrally located within the assembly and two secondary beam sections 34 releasably coupled at opposing ends of the main beam section such that a longitudinal direction of each secondary beam section is in alignment with the longitudinal direction of the main beam section 32. The main beam section may have a length of 30 feet for example with cable anchors 24 being positioned at spaced apart locations such that the main beam section can be used alone for suspending suitable elongate cargo items therefrom.

In the illustrated example, the secondary beam sections have a length of 10 feet such that when connected at opposing ends of the main beam section, a combined length of the beam assembly is 50 feet for supporting longer load items therefrom. Each secondary beam section 34 has a beam coupling arrangement 36 associated therewith which includes some components supported on the inner end of the secondary beam section 34 and some components at the corresponding end of the main beam section 32 for cooperation together to couple each secondary beam section in abutment with the corresponding end of the main beam section 32.

The device 10 may be provided as a kit that further includes a pair of third beam sections 38 which are substantially identical in configuration to the secondary beam sections 34 but which are longer in length, for example 20 feet in length. In this instance, when coupling two of the third beam sections 38 at opposing ends of the main beam section 32, a combined length of the central beam assembly can reach 70 feet. Each third beam section 38 further includes a beam coupling arrangement 36 associated therewith for releasably coupling the third beam section to the corresponding end of the main beam section. The beam coupling arrangement 36 of the third beam sections are identical to the beam coupling arrangements of the secondary beam sections so that some components are located at the corresponding end of the main beam section for cooperation with other components at the inner end of the third beam section. The same components on the ends of the main beam section can be used for cooperation with the beam coupling arrangement components of either the secondary or third beam sections such that the third beam sections are interchangeable with the secondary beam sections on the main beam section.

All of the beam sections 32, 34 and 38 of the central beam assembly are formed primarily of an I-beam including a top flange 40 defined by a horizontal plate at the top of the beam, a bottom flange 42 defined by a horizontal plate at the bottom of the beam, and a web plate 44 connected between the top flange and the bottom flange. The web plate 44 is connected to each of the top and bottom flanges at a central location thereon to define a T-shaped junction of the web plate with each of the top and bottom flanges.

Each of the beam sections 32, 34 and 38 includes a pair of leg frames 46 mounted at spaced apart positions in the longitudinal direction along the bottom of the beam. Each leg frame comprises two legs 48 extending in opposing lateral directions outward from the beam at a downward and outward slope from the bottom flange 42 to respective feet 51 at the bottom of the leg frame at laterally opposing sides of the beam. The two feet 51 of each leg frame are spaced apart longitudinally from the two feet of the other leg frame of the beam section so that the two leg frames collectively define a set of four feet in a rectangular configuration in a common plane spaced below the bottom flange of the I-beam for supporting the beam spaced above a corresponding supporting surface, for example the ground, by a height of the legs 48.

Each leg 48 is formed by a pair of upright plates which are spaced apart in the longitudinal direction of the beam. Each upright plate includes a transverse stiffener flange extending along one edge thereof for stiffening of the plates forming the legs of the leg frame. The two plates of each leg 48 are joined by a horizontal connecting plate at the bottom outer end thereof which defines a respective foot 51 of the leg frame. Each upright plate of each leg 48 of the leg frame is joined to the corresponding upright plate of the opposing leg 48 of the leg frame by a coupling plate 50 centrally located between the two legs 48 at the top of the leg frame for coupling of the leg frame to the bottom flange 42 of the beam section. The two coupling plates 50 of each leg frame 46 are joined in abutment with the bottom side of the bottom flange 42 by a set of threaded fasteners received through cooperating apertures in the coupling plates and the bottom flange.

Each beam section 32, 34 and 38 further includes a plurality of the strap mounts 26 that are also spaced apart in the longitudinal direction along the bottom of the bottom flange 42 of the beam. Each strap mount includes a horizontal top plate 52 arranged to be bolted to the underside of the bottom flange of the respective beam section by threaded fasteners penetrated through cooperating apertures in the top plate 52 and in the bottom flange 42 of the beam section. The strap mounts 26 each include a depending plate 54 extending downward from the top plate parallel to the longitudinal direction of the beam. An aperture within the depending plate 54 enables a load strap or hook to be secured thereon for suspending the load from the beam sections.

In the illustrated example, the main beam section 32 includes a set of five strap mounts spaced apart in the longitudinal direction along the main beam section, including one strap mount at a central location and two of the strap mounts adjacent opposing ends of the main beam section. Also in the illustrated embodiment, the secondary beam section 34 includes one strap mount 26 in proximity to the outer end of the secondary beam section. The third beam section 38 is shown having one strap mount 26 at a central location thereon and one strap mount adjacent the outer end of the beam section.

Each beam section further includes one or more cable anchors 24 spaced apart in the longitudinal direction along the top of the central beam assembly. Each cable anchor 24 includes a base plate 56 arranged to be bolted to the top side of the top flange 40 of the respective beam section by threaded fasteners penetrated through cooperating apertures in the top flange 40 and the base plate 56. Each cable anchor further includes an upright plate 58 extending upward from the base plate, parallel to the longitudinal direction of the beam. An aperture within the upright plate 58 enables an attachment cable 18 or lift hook 20 to be secured thereon for suspending the device 10 from the lifting harness of the crane.

In the illustrated embodiment, the main beam section 32 includes two cable anchors 24 at spaced apart positions along the top side thereof, enabling the main been section to be suspended in a balanced and horizontal orientation when connected to the lifting harness by itself. Each secondary beam section 34 includes a single cable anchor in proximity to the outer end of the beam section, and each third beam section 38 includes one cable anchor 24 at a central location in the longitudinal direction of the third beam section.

Each of the removable secondary beam sections 34 and the removable third beam section 38 are also provided with additional handling anchors 60 mounted onto the top flange 40 in proximity to opposing ends of the being section. Each handling anchor includes a base plate 62 bolted to the top flange 40 of the beam and a hook plate 64 extending upward from the base plate and locating an aperture therein for connection to a lifting hook for lifting and handling of the removable beam section in a balanced manner when it is detached from the main beam section for assembling or disassembling the central beam assembly. The hook plates 64 of the handling anchors 60 extend upwardly at an inward slope towards one another for accommodating the slope of a pair of lifting cables that extend upwardly and inwardly towards a central lifting cable used for handling of the removable beam section.

The beam coupling arrangements 36 are associated with each of the removable secondary beam sections 34 and the removable third beam sections 38. Each beam coupling arrangement includes a first bracket 56 mounted onto the top flange of the main beam section and a second bracket 68 secured to the top flange at the inner end of a corresponding removable beam section 34 or 38. The first bracket includes a base plate 70 bolted flat against the top side of the top flange 40 and two side plates 72 extending upwardly from opposing longitudinally extending side edges of the base plate so as to be parallel and laterally spaced apart from one another. A pin aperture is located within each of the side plates 72 at a location spaced above the top flange of the beam for receiving a primary pin 74 extending laterally through both side plates horizontally and perpendicularly to the longitudinal direction of the beams. The side plates include lobes that protrude beyond the end of the main beam section within which the pin apertures are located for cooperating with corresponding portions of the second bracket 68 as described further below.

Each second bracket 68 includes a base plate 76 bolted flat against the top side of the top flange 40 of the removable beam section, and two side plates 78 extending upwardly from opposing longitudinally extending side edges of the base plate so as to be parallel and laterally spaced apart from one another. The side plates 78 of the second bracket define an internal dimension between the inner sides of the side plates which corresponds approximately to an outer dimension between the outer sides of the side plate 72 of the first bracket such that the side plates of the first bracket can be received between the side plates 78 of the second bracket in a mounted position of the beam sections coupled to one another. Each of the side plates 78 of the second bracket includes an end portion 80 protruding longitudinally inward beyond the inner end of the beam section to locate pin apertures therein for alignment with the corresponding pin apertures in the lobes of the second side plates 72 of the first bracket 66 when the beam sections are abutted into and with one another.

The innermost ends of the two end portions 80 of the side plates of the second bracket 68 extend longitudinally from the beam section upon which it is mounted in diverging relation relative to one another to assist in guiding entry of the first bracket between the side plate 78 of the second bracket when abutting the beam sections end-to-end with one another to be coupled together. The pin apertures within the side plate 78 of the second bracket 68 are aligned with the pin apertures in the side plate 72 of the first bracket 66 when the top and bottom flanges of the beam sections are aligned with one another to enable the primary pin 74 to be inserted through all pin apertures for coupling the first and second brackets to one another. The primary pin 74 may include an enlarged head at one end and a transverse aperture for a removable latching pin in the opposing end to ensure the primary pin remains coupled between the first and second brackets of the coupling arrangement until it is desired to be released by the operator.

Each beam coupling arrangement 36 further includes a lower bracket 82 comprised of two mounting plates 84 supported at opposing sides of the web plate of the removable beam section by threaded fasteners penetrated through cooperating apertures in the web plate and the mounting plates respectively. Each mounting plate 84 includes an end portion 86 protruding beyond the end of the beam such that the two end plates are spaced apart by the thickness of the web plate of the main beam section to receive the web plate of the main beam section therebetween when the beam sections are coupled together. The outermost end of each end portion 86 is angled such that the ends of the end portions 86 are in diverging relationship for guiding entry of the web plate of the main beam section into the gap between the mounting plates 84. Transverse apertures are provided within the end portions 86 of the lower bracket 82 and in the web plate of the main beam section to receive a secondary pin 88 removably inserted through the apertures to form a second pin connection between the beam sections in a mounted configuration. The secondary pin 88 similarly has an enlarged head at one end and a transverse aperture for receiving a removable latching pin in the opposing end to selectively retain the secondary pin 88 mounted within the corresponding apertures for coupling the beam sections together.

Additional apertures in the lower bracket may align with corresponding apertures in the web plate of the main beam section, while additional apertures in the first and second brackets 66 and 68 may align with one another so that threaded fasteners can be additionally penetrated through both of the upper portion and the lower portion of the beam coupling arrangement 36 in addition to the primary pin 74 and the secondary pin 88 if desired.

The second brackets 68 on each of the secondary and third removable beam sections 34 and 38 are all identical with one another such that all of the beam sections can be interchangeably mounted with one another on either end of the main beam section by using the first bracket 66 on either end of the main beam section.

The beam sections forming any of the configurations of the central beam assembly described above can be further stiffened to prevent lateral bending of the central beam assembly by use of one or more truss frames protruding laterally outward from the beams. The truss frames include a main truss frame 90 protruding outward from each of the two laterally opposing sides of the main beam section 34. Each main truss frame 90 includes a main web member 92 protruding laterally outward from a central location in the longitudinal direction of the beam and two main chords 94 connected at inner ends to the outer end of the respective main web member 92 to extend in opposing longitudinal directions towards respective outer ends of the chords connected to the corresponding sides of the main beam section adjacent the opposing ends of the main beam section.

Each web member 92 generally includes an upper frame member 96 and a lower frame member 98. Each of the upper and lower frame members is a U-shaped channel having a bridge plate 100 connected between two side plates 102 in a generally U-shaped configuration. Suitable mounting flanges are provided at the inner ends of the side plates and the bridge plate for bolting to the web plate 44 of the main beam section. The bridge plates 100 of the upper and lower frame members are supported parallel and spaced from one another by a suitable distance arranged to receive the inner ends of the main chords 94 therebetween. Suitable fasteners are bolted through both bridge plates and the corresponding ends of the chords to secure the inner ends of the chords relative to the main web member 92. The side plates of the upper frame member 96 extend upward from the bridge plate thereof while the side plates of the lower frame member 98 extend downward from the bridge plate thereof such that the side plates function as gussets to stiffen the bridge plates and the chords connected thereto relative to the web plate 44 of the main beam section. The main web member 92 of one main truss frame 90 is connected directly opposite from the corresponding web member 92 of the opposing main truss frame such that a common set of fasteners can be penetrated through the web plate 94 to coupled both main web members 92 relative to the beam section.

In addition to the main web member 92, each main truss frame 90 is also associated with two outer web members 104 protruding laterally outward from the corresponding side of the main beam section at longitudinally opposing ends of the main beam section respectively. The outer web members 104 are configured identically to the main web members 92 and serve to mount the outer ends of the main chords 94 between the bridge plates of the outer web members respectfully. Similarly to the main web member 92, each outer web member 104 is mounted opposite from a corresponding outer web member 104 of the other main truss frame 90 at the opposing side of the main beam section such that a common set of fasteners can be penetrated through the web plate 44 of the main beam section to connect two corresponding outer web members 104 commonly to the main beam section. The outer ends of the chords are connected to the respective outer web members 104 in close proximity to the web plate at the inner end of the outer web members 104 such that the chords 94 are sloped inwardly towards the main beam section as they extend longitudinally outward from the central main web member 92.

Each removable secondary or third beam section 34 or 38 further includes two modular truss frames 106 associated therewith at laterally opposing sides of the removable beam section. Each modular truss frame includes (i) a corresponding one of the outer web members 104 on the main beam section, (ii) a modular chord 108 connected between the outer web member 104 on the main beam section and a pivot mount 110 on the corresponding side of the removable beam section 34 or 38 at a location spaced outwardly from the inner end of the removable beam section, and (iii) an auxiliary chord 112 connected between the main web member 92 and the corresponding outer web member 104 to provide support to the outer web member which in turn supports the modular chord108.

More particularly, each modular chord is connected at the inner end thereof onto the corresponding outer web member 104 at a location spaced laterally out from the beam section at an outermost end of the outer web member 104, while being connected at the outer end thereof onto the corresponding pivot mount 110 in close proximity to the web plate 44 of the removable beam section. The modular chord 108 thus slopes inwardly towards the beam section while extend longitudinally outward from the main beam section in a normal working position of the spread bar device. The auxiliary chord 112 is connected to both the main web member 92 and the corresponding outer web member 104 at the outermost end of the web member farthest from the web plate 44 of the main beam section such that the auxiliary chord extends generally parallel to the main beam section.

Each pivot mount 110 is comprised of an upper mount 114 and a lower mount 116 which protrude laterally outward from the web plate of the removable beam section 34 or 38 to define a space between the upper and lower mounts that is sized to receive the outer end of the modular chord 108 therebetween. A pivot shaft connected through the outer end of the modular chord between the upper and lower mounts supports the modular chord for pivotal movement about an upright axis of the pivot shaft. In the instance of the shorter secondary beam section 34, the pivot mount is located in proximity to the outer end of the beam section, whereas in the instance of the longer third beam section 38, the pivot mount is located to be approximately centred in the longitudinal direction of the third beam section.

The connection of the inner end of each modular chord onto the respective outer web member 104 on the main beam section is accomplished by a pinned connection using a slidably removable mounting pin 118 which extends through corresponding apertures in the upper and lower frame members 96 and 98 of the outer web member 104 and in the inner end of the modular chord 108. When separating a removable beam section 34 or 38 from the main beam section, in addition to removal of the primary pin 74 and the secondary pin 88 to separate the beam sections, the mounting pin 118 is also removed to allow separation of the modular chord 108 on the removable beam section from the outer web member 104 on the main beam section to quickly disassemble the modular truss frame at each side of the removable beam section.

Figure 8:
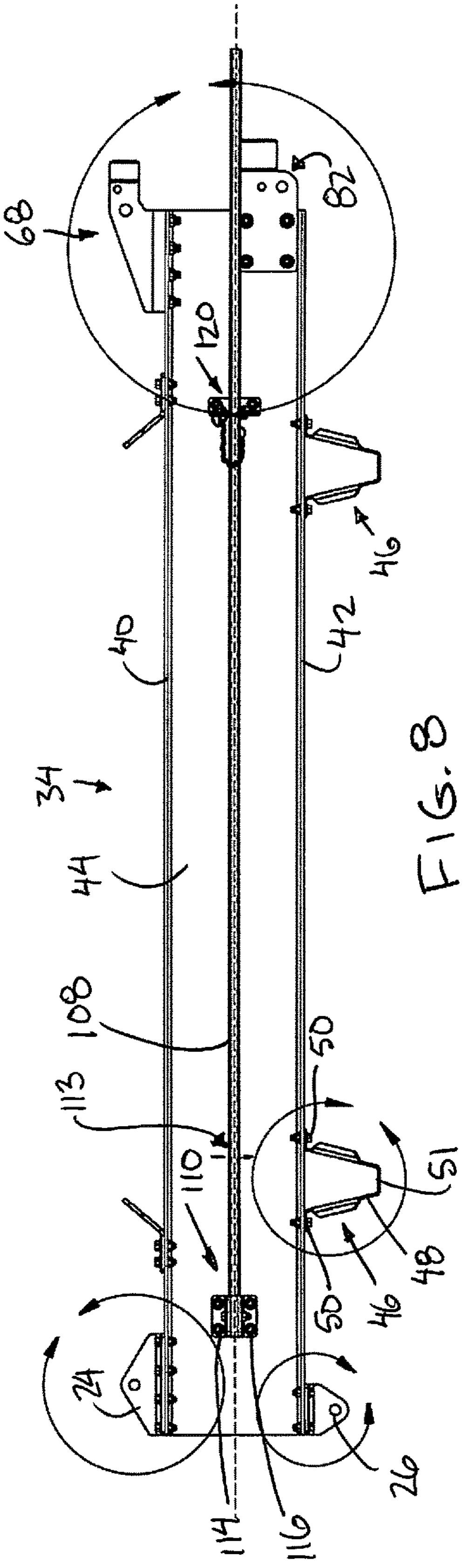
FIG. 8 is a side view of the secondary beam section of FIG. 7.
Figure 9:
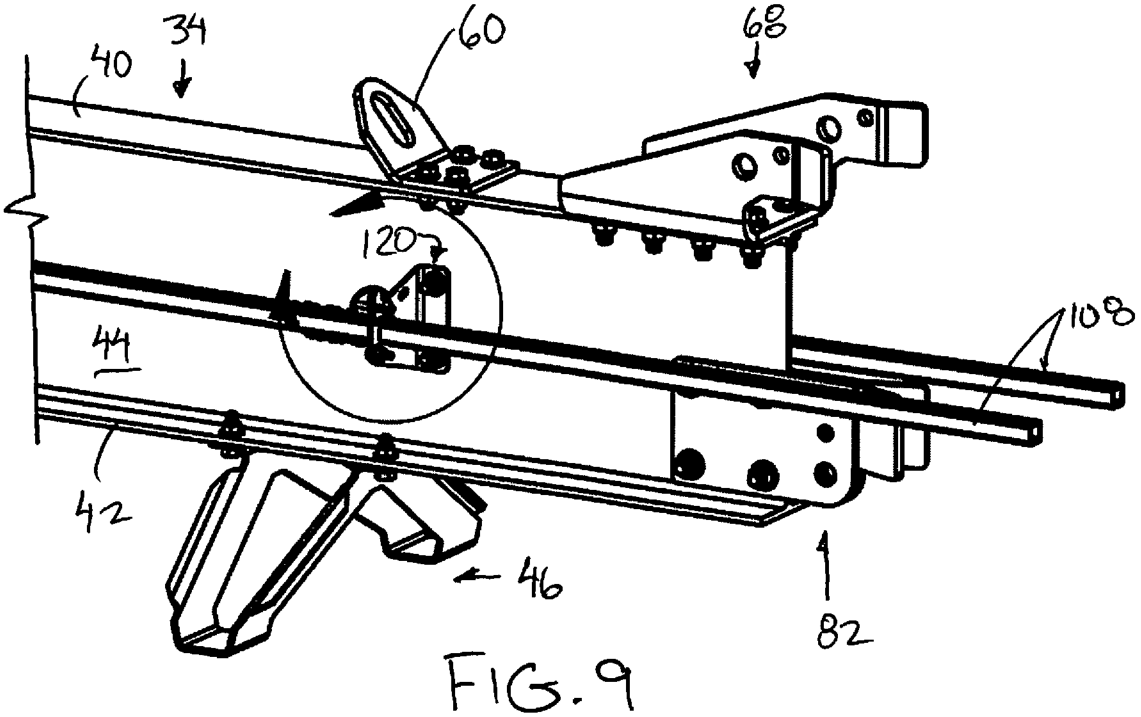
FIGS. 9 and 10 are enlarged views of respective opposing ends of the secondary beam section according to FIG. 7.
Figure 10:
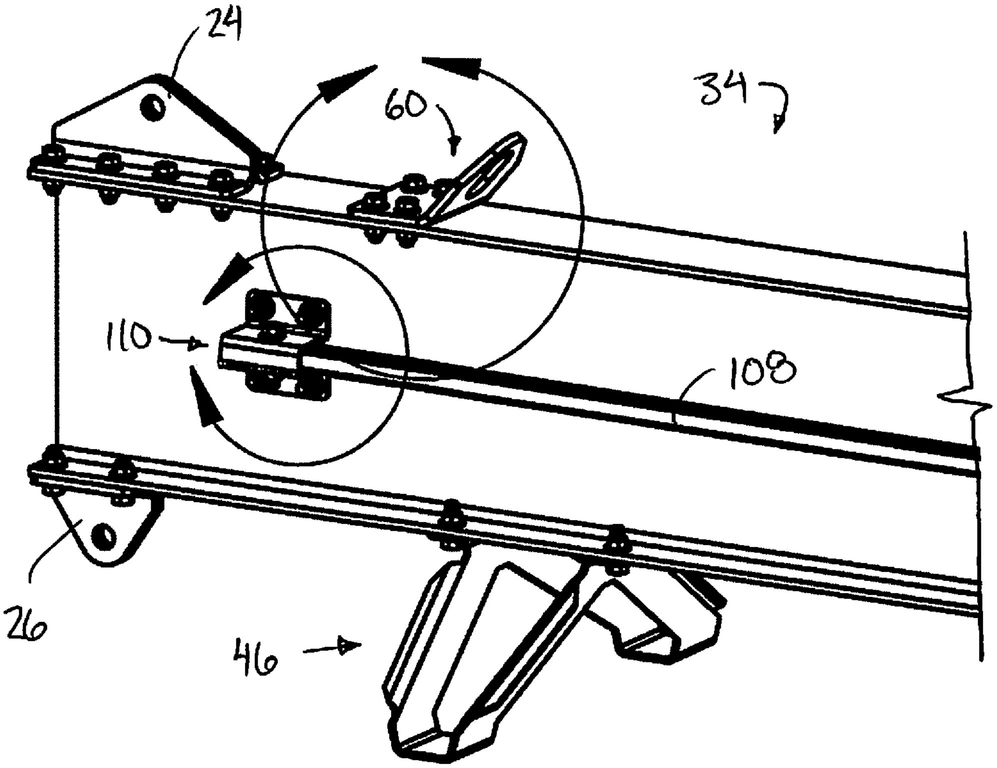
Figure 11:
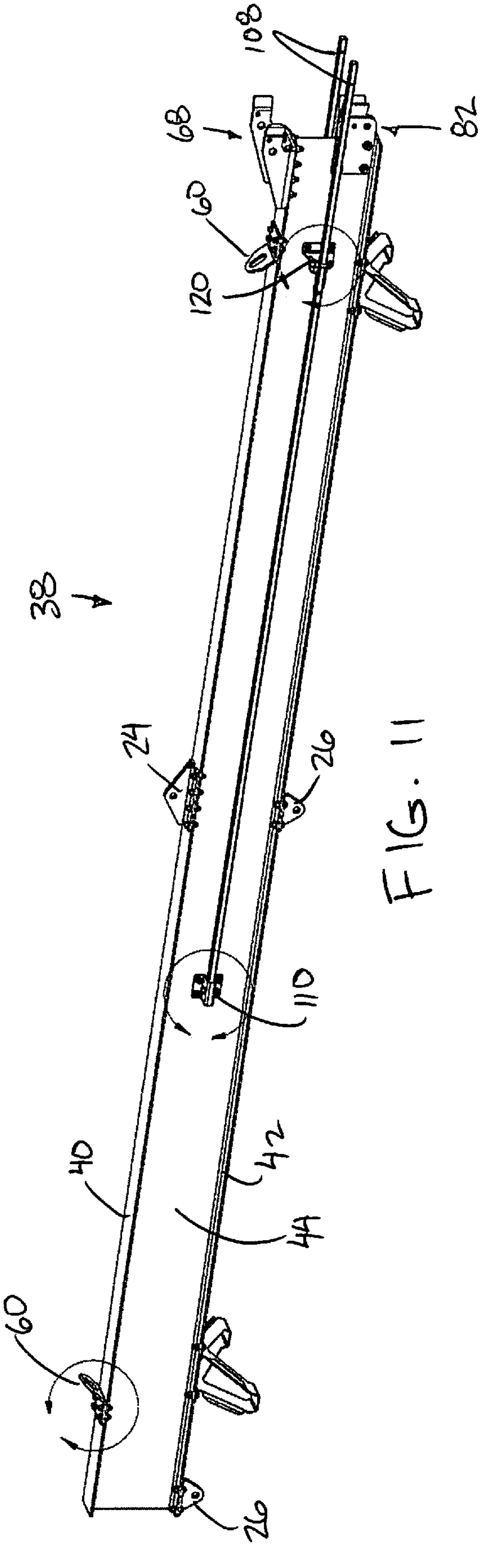
FIG. 11 is a perspective view of a third beam section which can be interchangeably coupled in place of the secondary beam section at either end of the main beam section according to a third configuration of the central beam assembly of the spread bar device.
Figure 12:
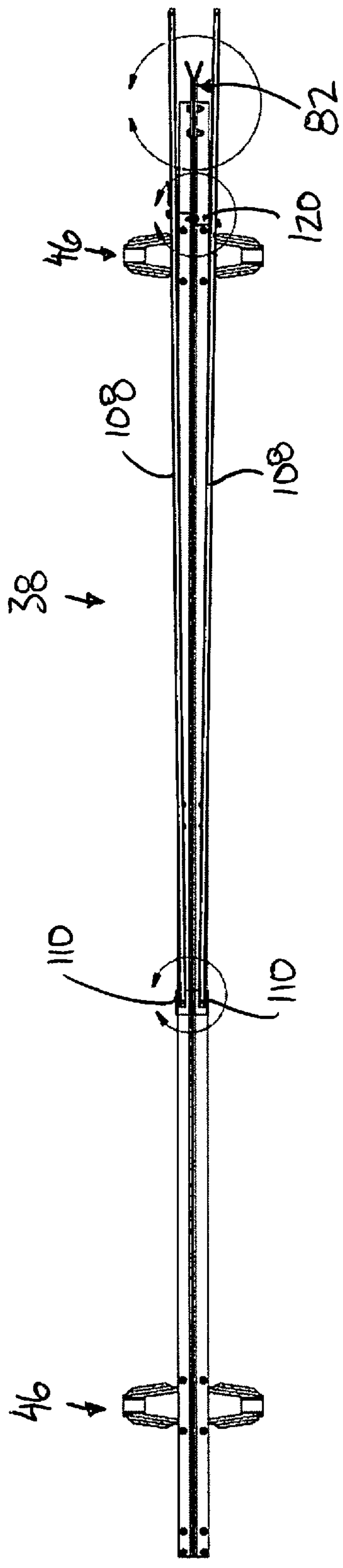
FIG. 12 is a side view of the third beam section according to FIG. 11.
Figure 13:
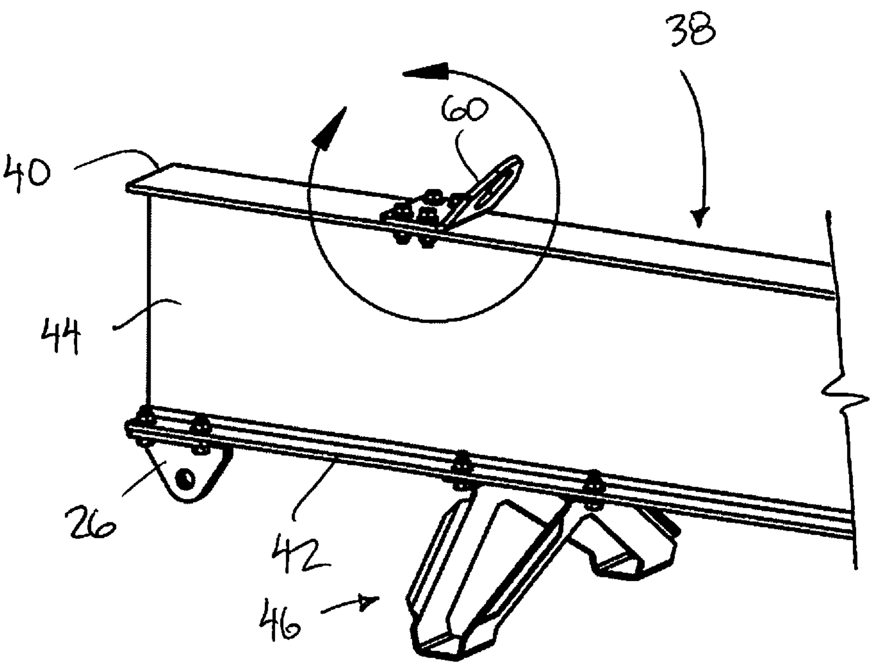
FIGS. 13, 14 and 15 are enlarged views of an outer end portion, a central portion, and on inner end portion of the third beam section according to FIG. 11.
Figure 14:
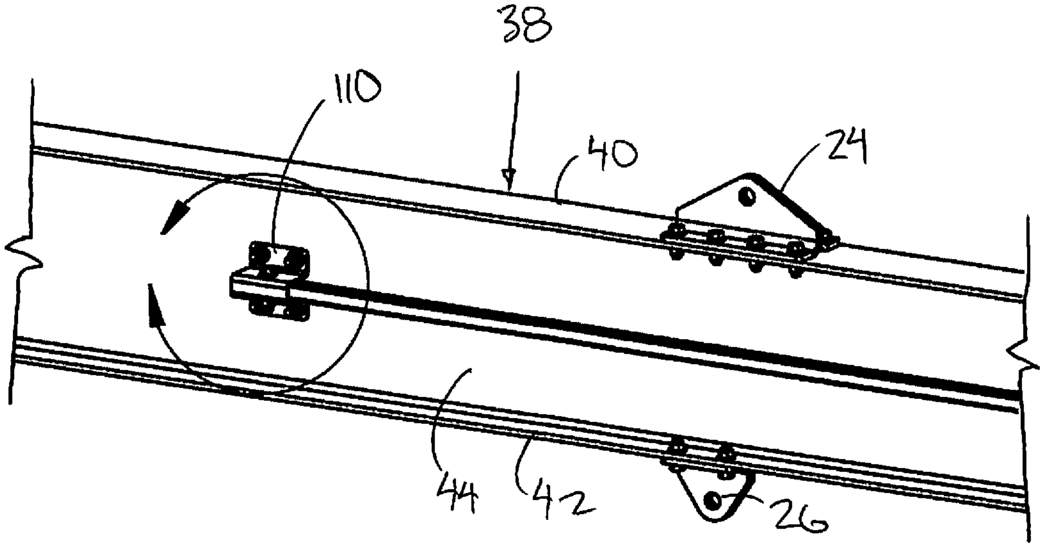
Figure 15:
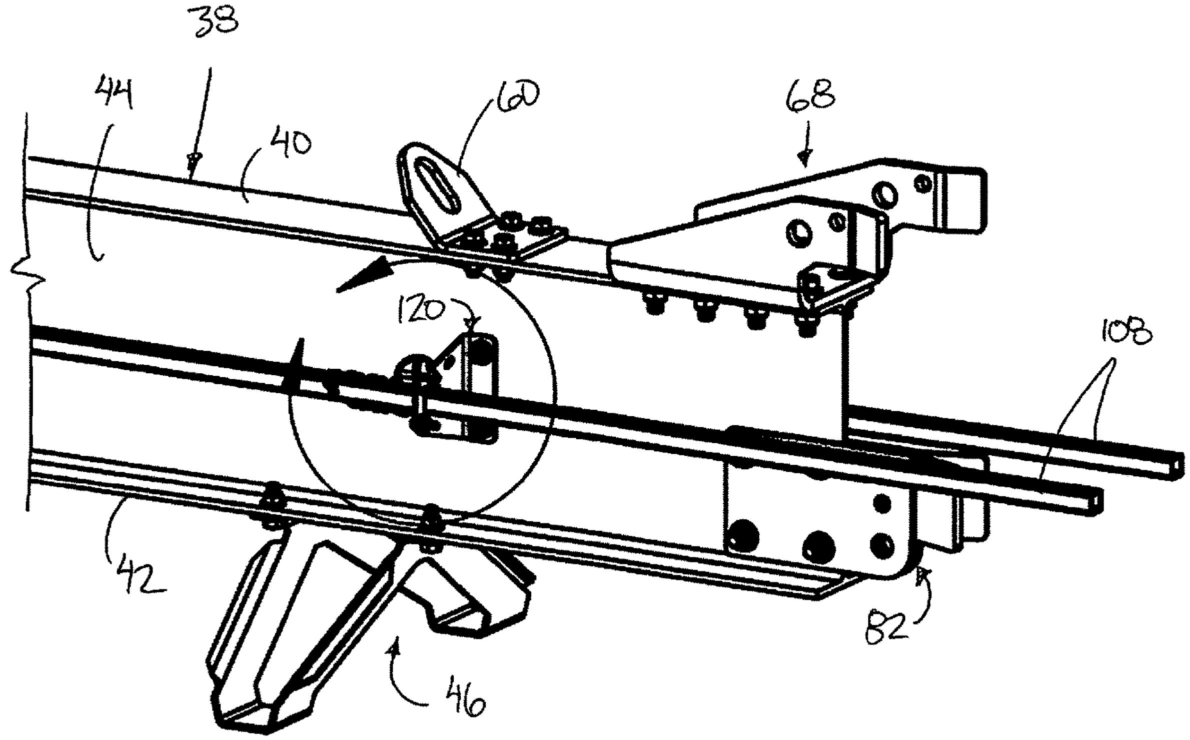
Figure 16:
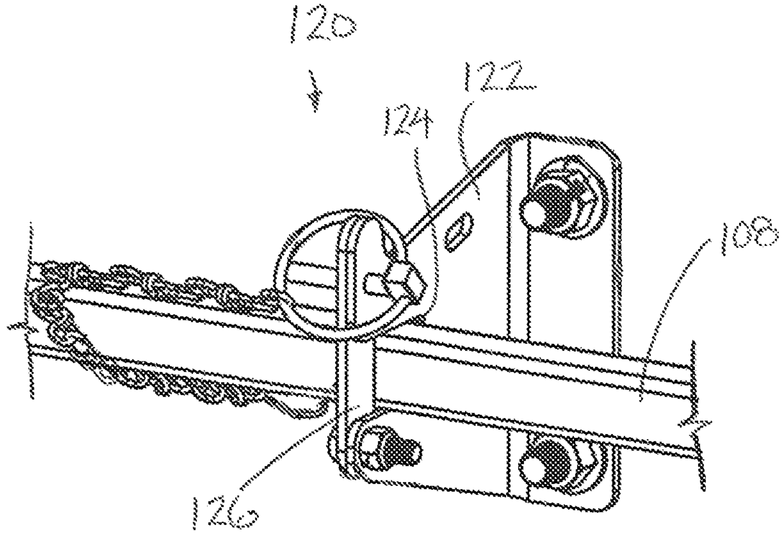
FIG. 16 is an enlarged view of the transport mount for supporting the chords of the modular truss frame of the secondary or third beam sections when separated from the main teen section for transport.

To store the modular cords 108 more securely during transport and handling of the removable beam sections when separated from the main beam section, a transport mount 120 is provided at the inner end of each removable beam section on each of the laterally opposing sides for securing the modular cords 108 at the opposing sides relative to the web plate 44 of the beam section. The transport mount 120 generally comprises an upright mounting plate 122 protruding laterally outward from the web plate 44 of the beam section with a channel 124 formed in the outer end of the plate. The channel 124 is sized to receive the corresponding modular chord 108 therein when the modular chord is pivoted inwardly into closer proximity to the web plate 44 of the beam section than the position of the modular chord in the assembled configuration of the beam assembly. The mounting plate 122 protrudes laterally outward a distance which is much less than the outer web member 104 that the modular chord 108 would normally be mounted on in the working assembled configuration, thus requiring the modular chord to be pivoted inwardly towards the beam section to arrive at the transport configuration thereof as shown in FIG. 8 for example.

Figure 7:
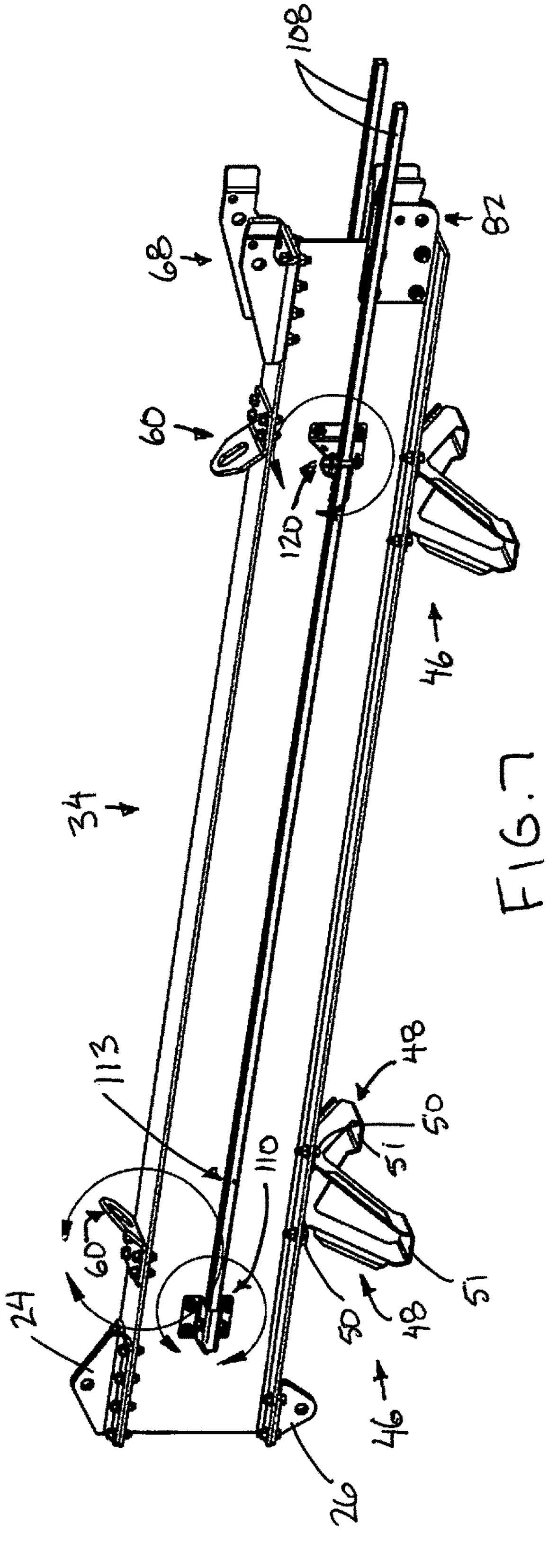
FIG. 7 is a perspective view of one of the secondary beam sections shown separated from the main beam section.

In further embodiments, the pivot shaft of each pivot mount 110 may be a slidably removable pin. When the pin is removed from the pivot mount 110, the modular chord 108 is longitudinally slidable relative to the pivot mount 110 and the transport mount 120 such that the protruding inner end of the modular chord as shown in FIGS. 7 and 8 can be retracted inwardly for transport and handling. In this instance, an auxiliary mounting aperture 113, represented schematically in FIGS. 7 and 8, is formed in the modular chord 108 for alignment with the pivot mount 110 when the modular chord is longitudinally retracted from the position of FIGS. 7 and 8 so that the modular chord no longer protrudes beyond other components at the inner end of the beam section. Reinsertion of the pin into the pivot mount 110 and through the auxiliary mounting aperture 113 in alignment therewith in the retracted position serves to secure the modular chord in the retracted, transport position.

Once the beam sections have been separated and the modular chords 108 are pivoted into the respective channels 124 in the mounting plates 122 of the transport mounts, a latch bar 126 can be pivoted across the open side of the channel and pinned in a closed position across the channel to retain the modular chord mounted within the corresponding transport mount. The latch bar 126 is hinged at one end and includes cooperating apertures for receiving a pin at the other end to couple the latch bar relative to the mounting plate 122 such that the latch bar can be opened and closed relative to the channel 124.

The spread bar device 10 as described herein is well suited for lifting elongate loads to be suspended from the lifting cable of a crane. In a first configuration, the main beam section 32 can be used apart from the removable secondary or third beam sections to define a single beam including two main truss frames 90 protruding outward from laterally opposing sides for providing lateral stiffening to the beam. This permits the spread bar to carry more load than a similar sized prior art spread bar that relies instead on the mass of the beam itself to provide sufficient lateral stiffening. Alternatively, the spread bar can carry the same load as a similar sized prior art spread bar that relies instead on the mass of the beam to provide sufficient lateral stiffening but according to the present invention is able to reach further in horizontal distance from the base of the crane while remaining within the lifting limits of the crane.

In the first configuration, the main beam section can be suspended from two attachment cables of the listing harness connected to the two cable anchors 24 spaced apart across the top of the beam section. Due to the placement of the strap mounts 26 below the main beam section, two, three, four or five load straps can be suspended in a distributed manner from the bottom of the main being section from which the load can be suspended.

The same benefits can be achieved when using a longer central beam assembly assembled from the main beam section 32 with two secondary beam sections connected at opposing ends thereof in a second configuration of the spread bar device 10. Attachment of the secondary beam section 34 is accomplished by suspending each secondary beam section from the corresponding handling anchors 60 to guide coupling of the first and second brackets 66 and 68 of each beam coupling arrangement while also guiding coupling of the lower bracket 82 with the web plate of the main beam section defining the lower portion of the beam coupling arrangement 36. Once the beam sections are connected by the primary pin 74 and the secondary pin 88, the modular chords 108 can be released from their respective transport mount and connected to the outer ends of the corresponding outer web members 104 to provide sufficient lateral stiffening between the removable secondary beam section 34 and the main beam section 32.

The same benefits can yet again be achieved when using the main beam section having two third beam sections connected at opposing ends thereof in a third configuration of the spread bar device 10. The central beam assembly is assembled by connection of the third beam section 38 to opposing ends of the main beam section 32 similar to the mounting of the secondary beam sections as described above.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A spread bar device for suspending a load from a crane using a lifting harness having a plurality of attachment cables, the device comprising:

a main beam section which extends in a longitudinal direction of the main beam section;

at least one secondary beam section which extends in a respective longitudinal direction of the secondary beam section;

a beam coupling arrangement associated with said at least one secondary beam section so as to be arranged to releasably couple the secondary beam section to one end of the main beam section such that the longitudinal direction of the secondary beam section is aligned with the longitudinal direction of the main beam section; and a plurality of cable anchors supported on the main beam section and said at least one secondary beam section so as to be arranged for connection to the attachment cables of the lifting harness respectively;

the cable anchors being positioned on the beam sections so as to be arranged to both (i) suspend the main beam section from the lifting harness when the main beam section is separated from said at least one secondary beam section and (ii) suspend the main beam section and said at least one secondary beam section from the lifting harness when the main beam section is coupled to said at least one secondary beam section; and at least one truss frame extending laterally outwardly from the beam sections so as to provide resistance to lateral bending of the beam sections.

2. The device according to claim 1 wherein said at least one secondary beam section comprises two secondary beam sections each having a respective beam coupling arrangement associated therewith, and wherein the beam coupling arrangements are arranged to releasably couple the secondary beam sections to opposing ends of the main beam section.

3. The device according to claim 1 wherein the cable anchors include two cable anchors at spaced apart positions along the main beam section and one cable anchor on each secondary beam section.

4. The device according to claim 1 further comprising at least one third beam section which extends in a respective longitudinal direction of the third beam section, the third beam section having a coupling arrangement associated therewith such that the third beam section is arranged to be selectively mounted on one end of the main beam section interchangeably with said at least one secondary beam section, said at least one third beam section being different in length than said at least one secondary beam section.

5. The device according to claim 4 further comprising:

said at least one secondary beam section comprising two secondary beam sections which are identical in length, each secondary beam section having a respective beam coupling arrangement associated therewith, and the beam coupling arrangements being arranged to releasably couple the secondary beam sections to opposing ends of the main beam section; and said at least one third beam section comprising two third beam sections which are identical to one another in length and different from the secondary beam sections in length, each third beam section having a respective beam coupling arrangement associated therewith, and the beam coupling arrangements being arranged to releasably couple the third beam sections to opposing ends of the main beam section.

6. The device according to claim 1 wherein said at least one truss frame is connected to the beam sections at spaced apart positions along the beam sections.

7. The device according to claim 1 wherein said at least one truss frame comprises two truss frames extending laterally outwardly from opposing sides of the beam sections.

8. The device according to claim 1 wherein said at least one truss frame includes a main truss frame having a web member extending laterally outwardly from the main beam section and two chords extending in opposing directions from the web member in connection between the web member and the main beam section.

9. The device according to claim 1 wherein said at least one truss frame includes a modular truss frame associated with said at least one secondary beam section, the modular truss frame having a web member extending laterally outwardly from the main beam section and a chord in connection between the web member and the secondary beam section.

10. The device according to claim 9 wherein said at least one truss frame includes two modular truss frames associated with said at least one secondary beam section, the two modular truss frames including respective web members extending laterally outwardly from opposing sides of the main beam section and respective chord members in connection between the respective web members and the secondary beam section.

11. The device according to claim 1 wherein each beam section comprises two feet spaced laterally outwardly from each side of the main beam section at longitudinally spaced positions so as to be arranged to support the beam section spaced above a supporting surface upon which the feet are engaged.

12. The device according to claim 1 further comprising a plurality of strap mounts supported at spaced apart positions along a bottom of the beam sections, each strap mount being arranged to receive a load strap secured thereon for suspending a load from the strap mount.

13. A spread bar device for suspending a load from a crane using a lifting harness having a plurality of attachment cables, the device comprising:

a main beam section which extends in a longitudinal direction of the main beam section;

at least one secondary beam section which extends in a respective longitudinal direction of the secondary beam section;

a beam coupling arrangement associated with said at least one secondary beam section so as to be arranged to releasably couple the secondary beam section to one end of the main beam section such that the longitudinal direction of the secondary beam section is aligned with the longitudinal direction of the main beam section; and a plurality of cable anchors supported on the main beam section and said at least one secondary beam section so as to be arranged for connection to the attachment cables of the lifting harness respectively;

the cable anchors being positioned on the beam sections so as to be arranged to both (i) suspend the main beam section from the lifting harness when the main beam section is separated from said at least one secondary beam section and (ii) suspend the main beam section and said at least one secondary beam section from the lifting harness when the main beam section is coupled to said at least one secondary beam section;

wherein each beam coupling arrangement includes a primary pin coupling the beam sections in end to end abutment with one another.

14. The device according to claim 13 wherein each beam coupling arrangement includes a pair of guide flanges protruding beyond an end of one of the beam sections in diverging relation to one another for guiding alignment of the beam section with an adjacent beam section to be coupled thereto.

15. The device according to claim 13 wherein the primary pin of each beam coupling arrangement is located spaced above the beam sections.

16. The device according to claim 13 wherein each beam coupling arrangement further includes a secondary pin coupling the beam sections in end to end abutment with one at a location spaced below the primary pin.

17. A spread bar device for suspending a load from a crane using a lifting harness having a plurality of attachment cables, the device comprising:

a central beam assembly defining a singular beam extending in a longitudinal direction of the central beam assembly;

a plurality of cable anchors supported on the central beam assembly so as to be arranged for connection to the attachment cables of the lifting harness respectively; and at least one truss frame extending laterally outwardly from the central beam assembly so as to provide resistance to lateral bending of the central beam assembly;

wherein said at least one truss frame includes a main truss frame having a web member extending laterally outwardly from the central beam assembly and two chords extending in opposing directions from the web member in connection between the web member and the central beam assembly.

18. The device according to claim 17 wherein said at least one truss frame comprises two truss frames extending laterally outwardly from opposing sides of the central beam assembly.

19. The device according to claim 17 further comprising:

the central beam assembly comprising (i) a main beam section which extends in a longitudinal direction of the main beam section, (ii) at least one secondary beam section which extends in a respective longitudinal direction of the secondary beam section, and (iii) a beam coupling arrangement associated with said at least one secondary beam section so as to be arranged to releasably couple the secondary beam section to one end of the main beam section such that the longitudinal direction of the secondary beam section is aligned with the longitudinal direction of the main beam section; and said at least one truss frame including a modular truss frame associated with said at least one secondary beam section, the modular truss frame having a web member extending laterally outwardly from the main beam section and a chord in connection between the web member and the secondary beam section.

* * * * *